MICROWAVE ADDER CIRCUIT
Filed March 24, 1959 2 Sheets-Sheet 1
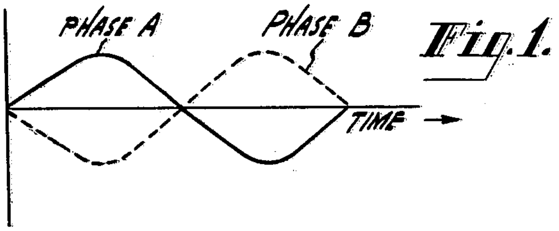
FIG. 1.
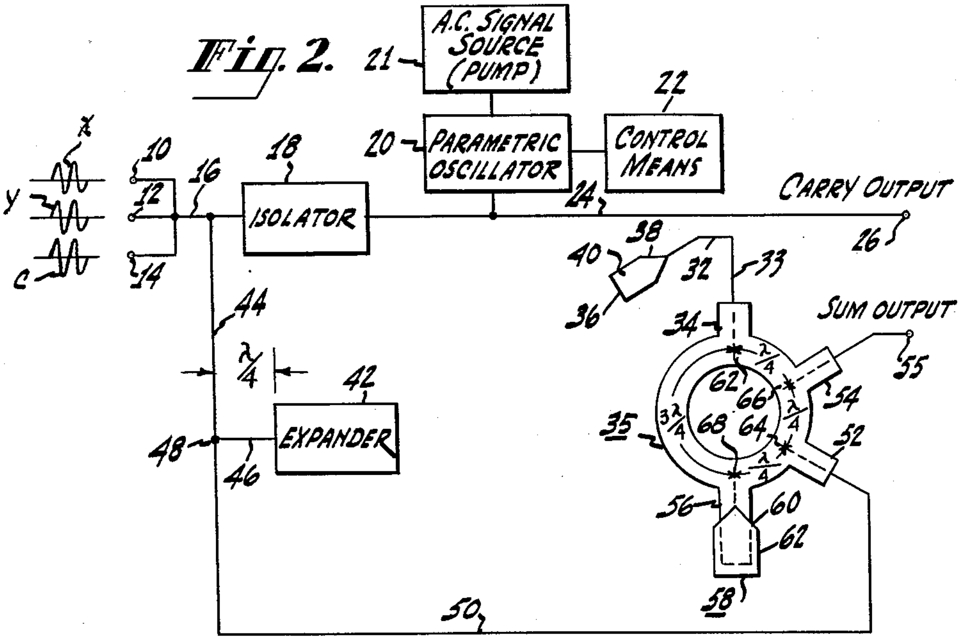
FIG. 2.
| CASE | X | Y | C | SUM OUTPUT | CARRY OUTPUT |
|---|---|---|---|---|---|
| I | 0 | 0 | 0 | 0 | 0 |
| II | 0 | 1 | 0 | 1 | 0 |
| III | 1 | 1 | 0 | 0 | 1 |
| IV | 0 | 0 | 1 | 1 | 0 |
| V | 0 | 1 | 1 | 0 | 1 |
| VI | 1 | 0 | 0 | 1 | 0 |
| VII | 1 | 0 | 1 | 0 | 1 |
| VIII | 1 | 1 | 1 | 1 | 1 |
BINARY ADDITION RULES FOR A FULL ADDER
FIG. 3.
INVENTOR.
FRED STERZER
BY Milton S. Winters
ATTORNEY INVENTOR.
FRED STERZER
BY Milton S. Winters
ATTORNEY United States Patent Office 3,094,612
Patented June 18, 1963

3,094,612
MICROWAVE ADDER CIRCUIT

Fred Sterzer, Monmouth Junction, N.J., assignor to Radio Corporation of America, a corporation of Delaware
Filed Mar. 24, 1959, Ser. No. 801,531
6 Claims. (Cl. 235—176)

This invention relates generally to information handling circuits and particularly to full adder circuits.

Full adder circuits are used in digital computers, for example, to form the sum of two binary numbers. Prior art circuits of this type may include, for example, a plurality of bistable circuits connected together in a predetermined manner. Most such circuits utilize devices which have a first stable state characterized by high current conduction and a second stable state characterized by low current conduction. The two stable states represent, respectively, a binary "one" and a binary "zero."

It has been suggested that information handling systems use R.F. (radio frequency) signals to represent information in coded form. For example, R.F. signals of one frequency and phase may represent a binary "one" in one such system and R.F. signals of the same frequency but of opposite phase may represent a binary "zero." The term phase script is frequently used to denote an information coded scheme of this type. Certain advantages are obtained in such a system when the adder circuits are adapted to handle information expressed in the machine language.

It is desirable in information handling systems that the circuit components used therein be high speed both in response and recovery time. It is also desirable that they be simple, reliable in operation, and have low power requirements.

It is an object of the present invention to provide an improved, high speed, full adder circuit.

Another object of the present invention is to provide an improved full adder circuit which is reliable in operation and has low power requirements.

Still another object of the present invention is to provide a novel and improved high speed full adder circuit adapted to handle information encoded in phase script.

A further object of the present invention is to provide a new and improved full adder circuit wherein a binary "one" and a binary "zero" are represented by two distinct phases of radio-frequency signals at the same one frequency.

It is yet another object of the present invention to provide a new and improved full adder circuit which utilizes only one bistable element therein.

These and other objects and advantages are provided in the present invention by first directly combining and amplifying a plurality of phase script coded binary signals. A first part of the combined and amplified signal is applied to a carry output terminal. A second part of the combined and amplified signal is shifted 180° in phase with respect to the signal at the carry output terminal and applied to a sum output terminal. A third part of the combined signals is also applied to the sum output terminal only when the plurality of input signals are in the same phase. At the same time, the third part of the combined signal is shifted in phase so that at the sum output terminal it is of the same relative phase as the signal at the carry output terminal.

In the accompanying drawings:

FIGURE 1 illustrates two sinusoidal signals of the same frequency and of opposite phase which represent respectively the binary information signals;

FIGURE 2 is a schematic diagram, partly pictorial and partly in block form, of a binary full adder circuit in accordance with the present invention;

FIGURE 3 is a truth table showing the binary addition rules for a full adder;

Figure 4:
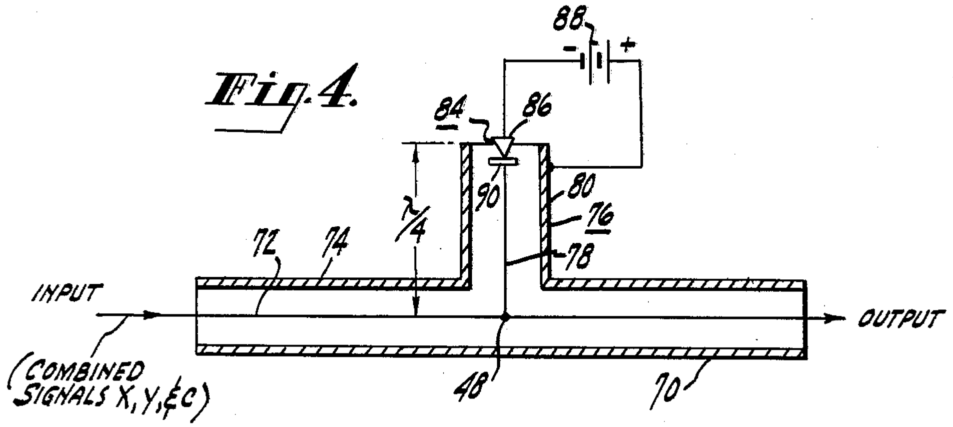
FIGURE 4 is a schematic drawing, partly in cross section, showing a component which is termed herein an "expander"

FIGURE 1 illustrates two sinusoidal signals of the same one frequency but differing in phase by 180° and designated "phase A" and "phase B," respectively. Signals of this type are termed phase script and are used to represent the binary information signals "one" and "zero" in the full adder circuit of the present invention. For example, a "one" may be represented by "phase A" and a "zero" by "phase B." Waveforms of this type may be generated by parametric oscillator circuits, one of which is illustrated and described in the copending application of Walter R. Beam and Fred Sterzer, Serial No. 770,822, filed October 10, 1958, now Patent No. 3,051,844, for "Parametric Oscillator Circuits" and assigned to the assignee of the present invention.

FIGURE 2 shows a schematic diagram partially in block form and partially in pictorial form of a novel microwave full adder circuit in accordance with the present invention. Three input signals X, Y and C, in phase script form, are applied to three input terminals 10, 12 and 14, and sum and carry output signals are provided by the circuit. The signals X and Y represent the two binary digits to be added and the signal C represents a carry digit which may be generated in a previous adder circuit. In the drawing, the three input signals are shown in the same phase and may represent either all binary "ones" or all binary "zeros." In this circuit the input signals are first combined in a length of transmission line 16, connected with each of the input terminals. From the transmission line 16, the input signals are split up, with a first part being fed through a ferrite isolator 18 to a parametric subharmonic oscillator 20 and a second part being fed through a length of transmission line 44 to an expander 42. The isolator 18 is preferably a nonreciprocal energy translating device which provides a high degree of attenuation, relatively speaking, in the back or left direction and low attenuation in the forward or right direction. A suitable isolator for this purpose is described, for example, in the article entitled, "A New Ferrite Isolator," in the Proceedings of the IRE, volume 44, pages 1421–1430, October, 1956. The signals passed in the forward direction by the ferrite isolator 18 are applied to a parametric subharmonic oscillator 20 arranged to operate as an amplifier. A type of parametric subharmonic oscillator suitable for use in the present invention is more fully described in the copending application of Walter R. Beam and Fred Sterzer cited heretofore. Connected with the parametric oscillator 20 is an A.C. signal source or pump 21 which supplies energizing signals thereto, and a control means 22 which periodically causes the parametric oscillator 20 to cease oscillation, in order that its phase of oscillation may be controlled by the combined input signal as explained more fully hereinafter. The parametric subharmonic oscillator provides an amplified output signal of the same phase as the combined input signal. The isolator 18 prevents the output signal from the parametric subharmonic oscillator 20 from being fed back to the input terminals 10, 12 and 14.

The output signal from the parametric oscillator 20 is applied to a transmission line section 24 which is further connected to a terminal 26, at which the carry output signal is obtained. A portion of the carry output signal is also coupled from the transmission line 24 to one arm 34 of a hybrid junction 35 by means of a directional coupler 32 provided adjacent to the transmission line section 24 in a known manner. The directional coupler 32 provides loose coupling between the transmission line 24 and the arm 34 and is connected thereto via a section of transmission line 33. The directional coupler 32 is terminated at one end with absorptive material 36 such as graphite, to minimize reflections from that end. The termination 36 may be a card coated with graphite and having a tapered section 38 which is laid over the end portion of the coupler and having a rectangular section 40 into which the tapered portion 38 merges. Such terminations are known.

The second part of the combined input signals from the transmission line 16 is fed by a length of transmission line 44 to a non-linear transmission element termed an expander 42. The expander 42 is connected to the transmission line 44 at a junction 48 by still another length of transmission line 46. The transmission line 46 is made an odd number of quarter wavelengths long at the operating radio-frequency for reasons described hereinafter. Because of the expander 42, the combined input signals X, Y and C pass the junction point 48 only if these signals are all in the same phase. For example, if the input signals X, Y and C are all binary "ones" or all binary "zeros," they pass the junction 48 and are coupled by transmission line section 50, an extension from the junction 48 of the line 44 to a second arm 52 of the hybrid junction. If the combined input signals are not all in the same phase, they are reflected at the junction 48 to return along the line 44. The expander 42 is described more fully hereinafter.

The hybrid junction 35, which may be a Magic-T or a rat-race, has an output arm 54 connected with a terminal 55 at which a sum output signal is obtained. The fourth arm 56 of the hybrid junction 35 is terminated in a matched absorptive termination 58 such as is known in the art, and which may be similar to the termination 36. The termination 50 may have a tapered portion 60 which is laid over the end part of the arm 56 and a portion 62 into which the tapered portion 60 merges. The arms 34, 52, 54 and 56 have, respectively, junctions 62, 64, 66 and 68 spaced apart around a circular path which is $3\lambda/2$ in mean circumference, where $\lambda$ is a wavelength along the path, at the R.F. frequency. Electrically, the junctions 62, 64, 66 and 68 are spaced apart $\frac{1}{4}\lambda$ at the R.F. operating frequency in one direction around half of the circular path and the junctions 62 and 68 are spaced apart $\frac{3}{4}\lambda$ at the R.F. operating frequency around the other half of the circular path.

The transmission line 33 is adjusted to provide a signal path an odd number of half-wavelengths long between the directional coupler 32 and the junction 66 in the hybrid junction. That is, the signal from the transmission line 24 which is coupled to the hybrid junction is shifted 180° in phase upon reaching the junction 66. The transmission line 50 is adjusted in length so that the portion of the combined input signals from the transmission line 16 which pass the expander junction 48 arrive at the junction 66 in the hybrid ring 180° out of phase with the signal applied to this junction by the directional coupler 32. The reasons for these adjustments is made clear hereinafter. Care must be taken to insure that, after the formation of the sum and carry signals, their relative phases with respect to each other be maintained constant.

The "truth table" for a full adder circuit is shown in FIGURE 3, where X and Y represent the two binary numbers to be added and C represents the carry signal generated in some previous adder stage. The eight possible combinations of input signals are shown in the appropriate columns of the table. It is to be noted from the table that a binary full adder accepts signals each of which may represent a "one" or a "zero" from three different sources and adds them to yield 00, 10, 01, or 11 according to whether none, one, two, or all three of the input signals are "ones," the right hand digit of the result representing the carry digit and the left hand digit representing the sum digit. The sum digit is normally used directly, while the carry digit is normally applied either to another adder circuit or another logic circuit, or the carry output, with suitable delay interposed, may be connected to the adder carry input to yield a serial binary adder.

The operation of the circuit of FIGURE 2 may now be explained with reference to the table of FIGURE 3. First, consider the generation of the carry digit. It is seen from this table that for any combination of input signals the carry digit is always the same as the majority of the input signals X, Y and C. That is, if two or more of the signals X, Y and C are binary "ones," then the carry digit is a binary "one." Similarly, if two or more of the inputs X, Y and C are binary "zeros," then the carry digit is a binary "zero."

In the adder circuit of FIGURE 1, the phase script input signals X, Y and C are combined in the common transmission line 16. These signals are all at the same frequency but may differ in phase by 180°. Therefore, when the signals are combined, they either directly add or subtract. The resultant signal thus has one phase which is the same phase as the majority of the input signals.

The resultant signal thus formed is then coupled by the isolator 18 to the parametric oscillator 20, which is arranged to operate as an amplifier. As is well known, a parametric subharmonic oscillator can be adjusted to oscillate in either of two distinct phases 180° apart by suitable selection of circuit parameters. Amplification may be achieved in the parametric oscillator by introducing a locking signal of the desired phase therein just before oscillations are about to start. The locking signal need only be a low power signal in order to control a higher power output signal from the parametric oscillator. Thus, in FIGURE 2, the combined input signal is fed to the parametric oscillator as a locking signal, and at the same time, the control means is arranged to periodically turn off the parametric oscillator in synchronism with the application of this combined input signal. In this manner, the combined signals control the phase of the parametric oscillator and an amplified output signal is obtained. A method of periodically turning off a parametric oscillator to achieve the above action is shown and described in the copending application of Walter R. Beam and Fred Sterzer cited heretofore. An amplified carry signal is desirable because the carry signal may be applied to the other adder circuits or logic circuits in digital information handling machines and may not be used directly. This amplified signal now is applied to the terminal 26 as the "carry" output.

By examination of cases II through VII of the truth table of FIGURE 3, it is noted that when the carry digit is a "one," the sum is a "zero" and vice versa. That is, the sum digit is always 180° out of phase with the carry digit in phase script coding. It is further seen from the truth table for the cases II through VII that the three input signals X, Y and C are not all of the same phase. That is, they are not either all "ones" or "zeros." Therefore, for reasons explained hereinafter, the expander 42 prevents these signals from passing the junction 48. Accordingly, for cases II through VII, the only signal applied to the hybrid junction 35 is the part of the carry signal coupled thereto by the directional coupler 32. But the circuit is arranged so that this part of the carry signal is shifted 180° in phase upon reaching the junction 66 in the hybrid ring. The signal at the junction 66 is coupled to the sum output terminal 55, and therefore, at this terminal the signal is opposite in phase to the carry signal. It is therefore the correct sum signal in accordance with the truth table of FIGURE 3.

Consider now the cases I and VIII wherein the three input signals X, Y and C are either all "zeros" or "ones," respectively. As shown in the truth table, when the signals X, Y and C are all "zeros" the sum output is a "zero,"

and when the signals X, Y and C are all "ones" the sum output is a "one." These input signals being all of the same phase, they result in a signal having sufficient amplitude so that the expander 42 passes them with relatively little attenuation to the arm 52 of the hybrid junction 35. At the same time, a portion of the carry signal is coupled to the hybrid junction by means of a directional coupler 32 and appears at the junction 66 reversed 180° in phase. The carry signal appearing at the junction 66 is in the opposite phase from what is required to provide the sum output signal. However, the signal applied to the arm 52 reaches the junction 66 in the proper phase to provide a representation of the sum signal. By properly adjusting the power transferred to the hybrid junction 35 by the directional coupler 32, the signal from the arm 52 cancels the signal received via arm 34 and provides sufficient additional power to provide the correct sum signal at the terminal 55. Thus, full adder operation is achieved by the circuit of FIGURE 2.

An expander may be constructed in one form as shown in FIGURE 4, utilizing conventional transmission line elements. This expander includes a main transmission line having an inner conductor 72 and an outer conductor 74. A coaxial line section 76 having an inner conductor 78 and an outer conductor 80 has one of its ends connected at a junction 48 to the main transmission line 70. Inner and outer conductors of the section 76 and the main line 70 are respectively connected together at the junction, so that the line section 76 is effectively in shunt with the main line 70. The line 76 has an effective length of λ/4 where λ is a wavelength in the transmission line at the operating frequency of the R.F. energy in the system. The line 76 is terminated at its end remote from the junction 48 by a crystal diode 84. The diode 84 has its anode 86 connected to a negative terminal of a suitable biasing source represented schematically by a battery 88. The positive terminal of the source 88 is connected to the output conductor 80 of the coaxial line section 76. The cathode 90 of the diode 84 is connected to the inner conductor 78 of line section 76. The diode is thereby reverse biased. A suitable return path for the D.C. is provided by any suitable conventional means. For example, such means may take the form of a resistance connected with the inner and outer conductors of a coaxial line portion in the system, or if another quarter wave length section in shunt with the main line 70 and short-circuited at its remote end.

Figure 5:
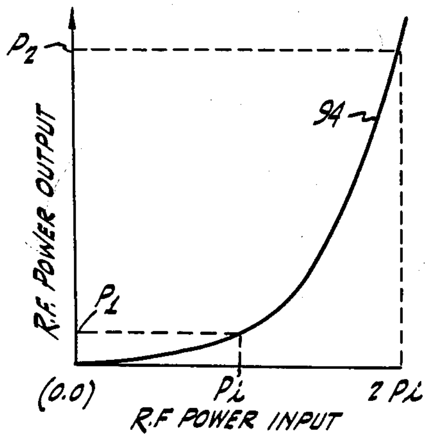
FIGURE 5 is a graph useful in explaining the operation of the component of FIGURE 4.

The operation of the expander of FIGURE 4 may now be explained with reference to the idealized graph of FIGURE 5. The curve 94 is a plot of power input applied to the main transmission line 72 from one side of the junction 82 plotted along the horizontal axis in units of $P_1$ and power output from the main transmission line 72 from the opposite side of the junction 82 plotted along the vertical axis. When the R.F. power input is low, for example, when the signals X, Y and C are not all in the same phase, the amplitude of the R.F. voltage at the diode 84 is insufficient to drive the diode into conduction. Therefore, the line section 76 is a quarter wavelength section, open circuited at its remote end. The line section therefore appears as a short circuit at the junction 82. Thus there is substantially no power output from the output of the main transmission line 72. This operation is illustrated by the portion of the curve 94 near the intersection (0,0) of the power input and power output axes in FIGURE 5, through which intersection the curve 94 passes. When the R.F. power input reaches a value, for example, $P_1$ the R.F. power output may have a value of $P_1$. However, as the power input increases to a value $2P_1$ the diode 84 begins to conduct heavily and the line section 76 appears more nearly matched than before. In an idealized case, the power divides at the junction 82 between the line section 76 and the output of the main transmission line 72. Accordingly, there is a substantial amount of power output $P_2$ corresponding to the power input $2P_1$. This is equivalent to the situation where the input signals X, Y and C are all in the same phase.

There has thus been shown and described a novel full adder circuit for phase script coded binary signals. The circuit is simple in construction and requires only one bistable element therein. The power requirements of the circuit are therefore low and its reliability is high. Circuits of this type are well adapted for use in high speed digital computers or other types of digital information handling machines.

What is claimed is:

1. In a full adder circuit in which the binary digits are represented, respectively, by two opposite phases of a radio-frequency signal, terminal means for receiving a plurality of radio-frequency binary signals, means for combining the received said binary signals, means for applying a first part of the combined signals to a first output terminal, means for simultaneously applying a second part of said combined signals unconditionally to a second output terminal 180° out of phase with respect to the signal at said first output terminal, means for applying a third part of said combined signals to said second output terminal only when said plurality of binary signals are all in the same phase, and means for shifting the phase of said third part of said combined signals to arrive 180° out of phase with said second part of said combined signals at said second output terminal.

2. In an information handling system in which the binary digits "one" and "zero" are represented, respectively, by radio-frequency signals of one phase and a counter phase at the same one frequency, the combination comprising: terminal means for receiving a plurality of radio-frequency binary signals; means for directly combining vectorially the received said binary signals; means for applying a first portion of the combined signals to an output terminal; a hybrid junction having a first input arm, a second input arm, and an output arm; means for applying a second portion of said combined signals to said first input arm such that said second portion arrives at said output arm 180° out of phase with respect to the portion at said output terminal; a nonlinear transmission element connected to receive a third portion of said combined signals and having a threshold such that said third portion is passed by said nonlinear element only when said plurality of signals all have the same phase; and means connecting the output of said nonlinear element to said second input arm such that the signals passed by said nonlinear element arrive at said output arm in phase with the signals at said output terminal.

3. The combination as claimed in claim 2 wherein said nonlinear transmission element comprises a section of transmission line having a length equal to an odd number of quarter wavelengths at said operating frequency, a diode terminating said section, and means for applying a direct current biasing voltage to said diode, said biasing voltage being poled to reverse bias said diode.

4. In a full adder circuit wherein the binary digits "one" and "zero" are represented by radio frequency signals of one phase and a counter phase, respectively, at the same one frequency, a plurality of terminal means for receiving a like plurality of said radio frequency binary signals, means connected to said terminals for combining said binary signals to provide a signal of the same phase as the majority of said binary input signals, a hybrid junction, means for applying a first part of said combined signals to said hybrid junction only when said binary signals are all in the same phase, means for amplifying a second part of said combined signals, means for applying a part of the amplified said combined signals to a first output terminal, means for applying another part of the amplified said combined signals to said hybrid junction, a second output terminal connected with said hybrid junction, means for shifting the phase of said first part of said combined signals applied to said hybrid junction to arrive at said second output terminal in phase with the signal output at said first output terminal, and means for shifting the phase of said amplified signals which are applied to said hybrid junction so that the latter said signals arrive at said second output terminal 180° out of phase with the signal output at said first output terminal.

5. A full adder circuit comprising in combination, a plurality of terminal means for receiving phase script coded binary information signals, means operatively connected to said terminal means for directly combining said binary signals, isolation means for applying a first portion of said combined signals to a parametric subharmonic oscillator circuit for amplifying said first portion of said combined signals, means for applying a first part of the amplified signals to a carry output terminal, means for applying a second part of said amplified signals to a hybrid junction, a sum output terminal connected with said hybrid junction, means for shifting the phase of said second part of said amplified signals so that they arrive at said sum output terminal 180° out of phase relative to the signals at said carry output terminal, means for applying a second portion of said combined signals to an expander, means for applying said combined signals which pass said expander to said hybrid junction, and means for shifting the phase of said combined signals which pass said expander so that at said sum output terminal they are in phase with said signals at said carry output terminal.

6. In an information handling system wherein the binary digits "one" and "zero" are represented by radio frequency signals of one phase and a counter phase, respectively, at the same frequency, a full adder circuit comprising: input terminals for receiving a plurality of radio frequency signals corresponding to two binary information digits and a carry digit; means connected to said terminals for combining vectorially said plurality of signals; a first output terminal connected to said combining means for deriving a "carry" output; a second output terminal for deriving a "sum" output; means unconditionally applying a first portion of the combined said signals to arrive at said second output terminal 180° out of phase with said "carry" output; a nonlinear signal attenuator connected to said combining means for passing a second, portion of the combined said signals only when all of the received said signals have the same phase, said second portion being of greater magnitude than said first portion; and means for applying the output of said attenuator to said second output terminal in phase with said "carry" output.

References Cited in the file of this patent

UNITED STATES PATENTS

| | | |
|---|---|---|
| 2,609,143 | Stibitz | Sept. 2, 1952 |
| 2,914,249 | Goodall | Nov. 24, 1959 |
| 2,987,253 | Schreiner et al. | June 6, 1961 |
| 2,987,630 | Schreiner | June 6, 1961 |
| 3,000,564 | Schreiner | Sept. 19, 1961 |